US007503156B2

United States Patent
Eibert

(10) Patent No.: US 7,503,156 B2
(45) Date of Patent: Mar. 17, 2009

(54) METHOD AND APPARATUS FOR MAKING DUNNAGE

(75) Inventor: Ralph Eibert, 11 Yuma La., Ringwood, NJ (US) 07456

(73) Assignees: Ralph Eibert, Ringwood, NJ (US); ML Distributing, LLC, Woodcliff Lake, NJ (US)

( * ) Notice: Subject to any disclaimer, the term of this patent is extended or adjusted under 35 U.S.C. 154(b) by 36 days.

(21) Appl. No.: 11/653,175

(22) Filed: Jan. 11, 2007

(65) Prior Publication Data

US 2008/0168746 A1 Jul. 17, 2008

(51) Int. Cl.
B65B 31/00 (2006.01)
(52) U.S. Cl. ............................ 53/403; 53/79; 53/DIG. 2
(58) Field of Classification Search ................. 53/79, 53/DIG. 2, 564, 570, 403, 452; 493/916
See application file for complete search history.

(56) References Cited

U.S. PATENT DOCUMENTS

| 3,254,828 | A | | 6/1966 | Lerner |
| 3,298,156 | A | | 1/1967 | Lerner |
| 3,477,196 | A | | 11/1969 | Lerner |
| 3,575,757 | A | * | 4/1971 | Smith ........................ 156/147 |
| 3,703,430 | A | * | 11/1972 | Rich ........................ 156/497 |
| 3,817,803 | A | * | 6/1974 | Horsky ........................ 156/85 |
| 3,938,298 | A | * | 2/1976 | Luhman et al. ................ 53/403 |
| 4,017,351 | A | * | 4/1977 | Larson et al. ................. 156/494 |
| 4,384,442 | A | * | 5/1983 | Pendleton .................... 53/554 |
| 4,517,790 | A | * | 5/1985 | Kreager ........................ 53/552 |
| 4,576,669 | A | | 3/1986 | Caputo |
| 4,674,268 | A | * | 6/1987 | Gavronsky et al. ............. 53/468 |
| 5,188,691 | A | | 2/1993 | Caputo |
| 5,203,761 | A | | 4/1993 | Reichental et al. |
| 5,573,491 | A | * | 11/1996 | Parker ........................ 493/352 |
| 5,581,983 | A | * | 12/1996 | Murakami .................... 53/512 |
| 5,660,662 | A | * | 8/1997 | Testone ........................ 156/145 |
| 5,679,208 | A | * | 10/1997 | Sperry et al. ................. 156/515 |
| 5,942,076 | A | * | 8/1999 | Salerno et al. ............... 156/359 |
| RE36,759 | E | * | 7/2000 | Hoover et al. ................ 156/147 |
| 6,190,296 | B1 | * | 2/2001 | Gnad et al. ..................... 493/8 |
| 6,290,635 | B1 | * | 9/2001 | Demmel et al. .............. 493/399 |
| 6,341,473 | B1 | | 1/2002 | Kovacs et al. |
| 6,635,145 | B2 | * | 10/2003 | Cooper ..................... 156/441.5 |
| 6,835,257 | B2 | * | 12/2004 | Perrine ...................... 156/73.1 |
| 6,889,739 | B2 | | 5/2005 | Lerner et al. |
| 6,948,296 | B1 | | 9/2005 | Lerner et al. |
| 6,952,910 | B1 | * | 10/2005 | Lorsch ........................ 53/472 |

* cited by examiner

Primary Examiner—Paul R Durand
(74) Attorney, Agent, or Firm—Jaime Siegel, Esq.

(57) ABSTRACT

An apparatus for manufacturing dunnage including a plurality of rollers for pulling a web of material through the machine, a nozzle with at least one port through which gas or liquid flows, a hammer mounted on an ultrasonic frequency converter, and an anvil mounted on the machine in a position such that the web of material can pass between the hammer and anvil while allowing the hammer to strike the anvil. The ultrasonic frequency converter is connected to a power source and generates vibrations at a frequency causing the hammer to vibrate at a frequency that will melt the portion of the material that is passing between the hammer and anvil thereby creating a seam. The ultrasonic frequency converter can be mounted on an arm and cam follower to account for variations in the thickness of the web material. The apparatus may be equipped to manufacture multiple pieces of dunnage simultaneously.

9 Claims, 6 Drawing Sheets

DETAIL A

SECTION B-B

METHOD AND APPARATUS FOR MAKING DUNNAGE

FIELD OF INVENTION

The invention relates to an improved process for producing dunnage, or "air pillows."

BACKGROUND OF THE INVENTION

Various materials are used to insulate goods from shock during shipping. Solid materials such as polystyrene "peanuts," cups and "worms," pellets of foam rubber, plastics and expanded polyurethane foam are in common use as a shock protector. Air cushioning material, or "air pillows," are generally preferred over the above types of dunnage because it is lighter in weight, can be supplied and dispensed in a controlled manner, and can be manufactured on site. Air Pillows are typically manufactured using rolls of sheet material, which is also easier to dispose of than the individual pieces of plastic dunnage after the product is removed.

Air pillows are typically manufactured on site because it is inefficient to ship preformed air pillows since they take up considerably more volume than the sheet material. Various devices have been described to produce sealed air dunnage, or air pillows, from sheet material. U.S. Pat. Nos. 5,188,691, 5,203,761, and 4,576,669 all propose devices for producing air filled dunnage, typically bubble wrap, from plastic sheets on an "on demand" basis.

U.S. Pat. Nos. 6,341,473, 6,889,739 and 6,948,296 each disclose a process for producing dunnage on site from plastic sheets where the plastic sheets are sealed after inflation using heating elements that contact the plastic sheets and weld them together.

However, these aforementioned processes and devices are disadvantageous in that because the heating elements must physically contact the plastic sheeting, they can become fouled. When heating elements become fouled, the dunnage producing machines must be cleaned or the heating elements must be replaced, resulting in down time and lost production. It is a further disadvantage that the aforementioned processes and devices are limited in their production speeds because of the need to allow the air pillow material to be physically melted between the heating elements to seal the air pillows. Current air pillow producing machines run at speeds between 18-40 feet per minute.

Another feature of existing dunnage machines are the use of two rubber wheels that engage the plastic sheeting to pull it through the inflation and sealing process. However the use of rubber wheels is disadvantageous because when the rubber wheels get dirty, slippage in the pillow material can occur.

SUMMARY OF THE INVENTION

It is therefore an object of the invention to produce air pillows on site in a manner that doesn't require heating elements to weld shut the air pillows.

It is a further object of the invention to produce air pillows on site by a process whereby the welding of the air pillow material is performed using a high frequency welder.

It is a further object of the invention to produce air pillows on site by a process that seals the air pillows at improved operating speeds.

It is a further object of the invention to produce air pillows with an improved seal.

It is a further object of the invention to produce air pillows using a material with a composition specially designed to be sealed at a specific high frequency.

To achieve these and other objects, the present invention provides a method for producing air pillows comprising the steps of providing, in roll form, a plurality of preformed plastic bags, where each of said bags comprise plastic sheets stacked upon one another and sealed along its edges except for a channel passing between the layers and open on opposite ends, the bags being removably attached in sequence along two opposed edges, inserting a tube into the open channel and blowing air through the tube causing each bag to inflate in sequence, and sealing the channel of each inflated bag to create an air pillow.

Typically, a roll of bags will be provided which is segmented longitudinally, but a roll can also be provided which is segmented both longitudinally and laterally, to produce a roll with, for example, four bags across or eight bags across. The bags can be separated from the roll individually or can be separated in groups. This is advantageous, as the air pillows which are produced can be wrapped around an object to protect it.

In accordance with the invention, the sealing of the open channel is accomplished using an ultrasonic energy to weld the layers of plastic to one another. By using ultrasonic energy, the plastic layers can be welded together without the need for heating elements to melt the plastic. Ultrasonic welding can occur at a higher rate than if the welding were done using physically hot elements. This technology will allow operating speeds that are almost 100-800% higher than existing machines.

Various types and thicknesses of material can be used to make the bags of the invention. The composition of the material must be such that the specific frequency of the particular ultrasonic energy generator used in an embodiment is capable of welding two or more layers of material together. By adjusting the frequency of the ultrasonic energy, suppliers can control the type of plastic material that can be used on their machines. The thickness of the material can be adjusted to provide extra strength or lighter weight, depending on which properties are desired.

Importantly, the apparatus used to inflate and seal plastic bags is well known and easy to operate. Typically, an air filled sealed bag will be used for packaging a small article. In this regard, U.S. Pat. Nos. 3,254,828, 3,298,156 and 3,477,196 are cited as representative patents showing methods and apparatus for blowing open bags on rolls.

In an additional embodiment of the invention, a metal knurled wheel is engaged with second wheel, possibly made of rubber, such that the plastic sheet material is pulled through the dunnage machine and the inflation and welding process. The welded seal can optionally be run directly between the knurled and second wheel to enable the knurled pattern to be embossed in the welded seal, thereby strengthening it.

In yet an additional embodiment, the high frequency generator is mounted on an arm connected to a spring loaded cam follower, which can be adjusted based on the frequency of the generator and the speed of the material passing through the dunnage machine to result in a satisfactory weld. The adjustment of the cam follower can ideally be made using a set screw to compress or relieve the spring.

These and other objects, advantages and features of the invention will become apparent to those skilled in the art upon consideration of the following description of the invention.

DETAILED DESCRIPTION OF THE INVENTION

Figure 1:
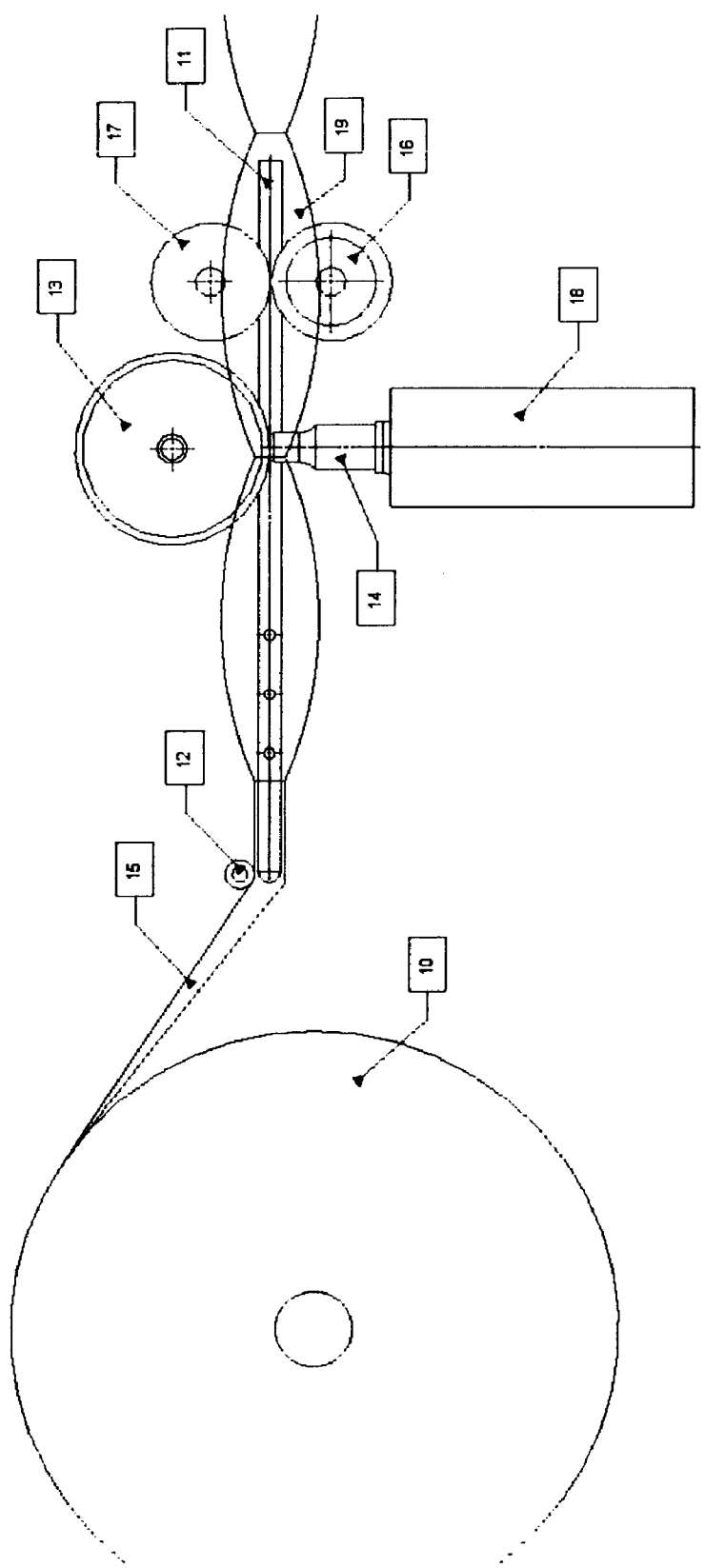
FIG. 1 a process flow for forming inflated dunnage.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. While the following description describes a dunnage formation system, it should be recognized the embodiments disclosed can be utilized to manufacture pouches filled with any aqueous or gaseous material. In the description below, like reference numerals are used to describe the same, similar or corresponding parts in the several views of the drawing.

Figure 2:
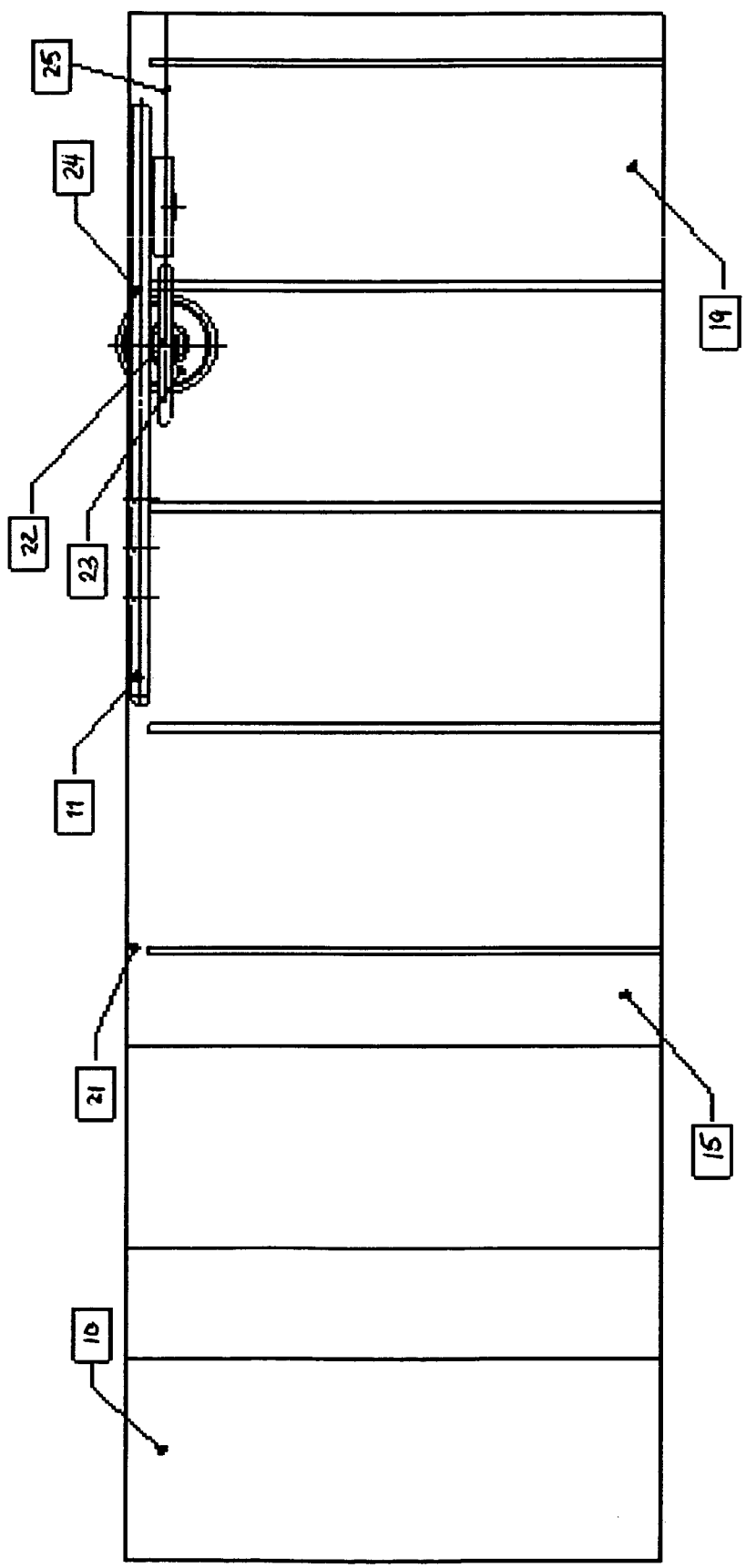
FIG. 2 is a plan view of device for forming inflated dunnage.

Referring now to the drawings and FIGS. 1 and 2 in particular, the process flow of a dunnage formation machine is shown. A web of plastic material 15 such as polypropylene is provided on a spool 10. The web is segmented longitudinally as shown in FIG. 2. The machine includes an ultrasonic frequency converter 18 on which a hammer unit 14 is mounted. The hammer unit 14 is arranged so that the web 15 is in contact with both the hammer unit 14 and a rotatable anvil wheel 13. The hammer unit 14 and the anvil wheel 13 are mounted such that the axis of rotation of the anvil wheel 13 is aligned with the central axis of the hammer unit 14. Air nozzle 11 is mounted on the machine to inflate the dunnage 19 as the web 15 passes through the machine.

When the machine is in use, pulley wheels 16 and 17 rotate to pull the web 15 from the spool of plastic material 10. The web 15 passes over a guide roll 12 and thence to the air nozzle 11 where the air nozzle 11 is positioned to be inserted into a portion 21 of the web 15 that is not completely sealed on the longitudinal edges of the non-inflated dunnage 19. The air nozzle allows compressed air to blow in between the layers of the web 15, thereby inflating a segmented portion of the web 15. The now inflated web 15 is fed through the interface of the hammer 14 and the anvil wheel 13 whereby layers of the web 15 are compressed and welded shut by the energy that is created by the vibrations generated in the hammer 14 by ultrasonic frequency converter 18. The composition of the plastic material of the web is such that it will liquefy when exposed to the frequency created by the ultrasonic frequency converter 18 and consequently, the layers of the plastic material of the web will be welded together to create a seam 25 in the now inflated web 15. Once the web 15 has been sealed, it is cut off of the air nozzle 11 by trimming the web material that is not part of the inflated portion of the web 15 or the seam 25. The seam 25 of the now inflated web 15 then passes through the pulley wheels 16 and 17. Either one or both of pulley wheels 16 and 17 are driven by a motor so that the web 15 is pulled through the machine. Inflated dunnage 19 is now the resulting product.

In practice the machine 10 will be housed within a cabinet which is not shown for clarity of illustration. The cabinet includes access doors with an electrical interlock. When the doors are open the machine may be jogged for set up, but the machine will not operate to produce dunnage units unless the doors are closed and latched.

In another embodiment, one or both of pulley wheels 16 and 17 are knurled wheels. In this manner, when the freshly created seam 25 passes through the interface between pulley wheels 16 and 17 pattern reflective of the knurled pattern is embossed on the still soft seam, thereby strengthening the seam.

Figure 3:
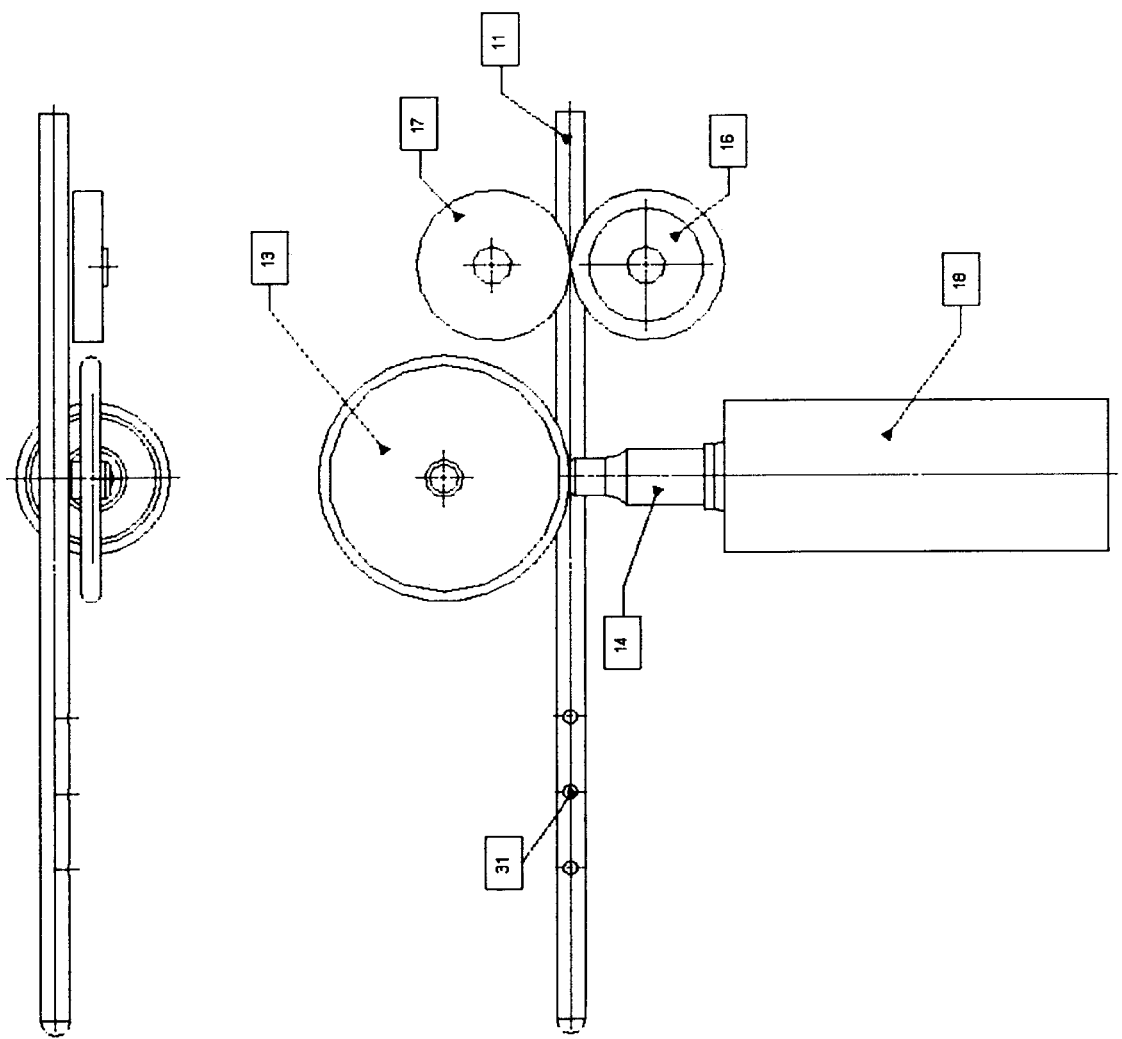
FIG. 3 is a plan view of a portion of the dunnage inflating machine.

Referring to FIG. 3, the relationship of the components of the dunnage producing machine is described. The hammer 14 is disposed on the ultrasonic frequency converter 18. An example of an ultrasonic frequency converter is the CRV233 Converter made by Sonics & Materials, Inc., although it will be recognized that other ultrasonic frequency generators can be used. The alignment of the axis of the hammer 14 and the anvil wheel 13 is shown. Air nozzle 11 is shown with 4 ports 31 for distributing air into the web material, however, it will be recognized that many other arrangements may be used for passing the substance that will be used to inflate the web such as one port or more in a variety of shapes. As shown in FIG. 3, the air nozzle is roughly in the same plane as the interface between the hammer 14 and anvil wheel 13 and between pulley wheels 16 and 17.

Figure 4A:
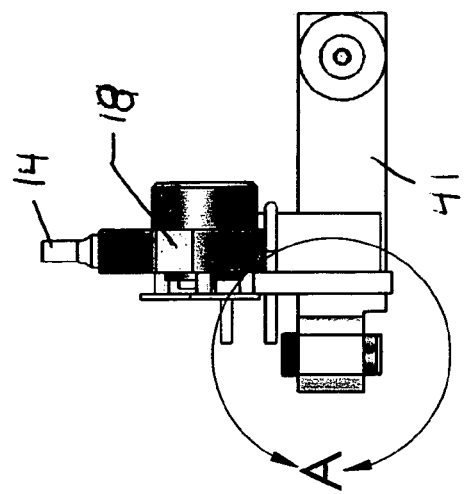
FIGS. 4a and 4b are views of the ultrasonic converter mount.
Figure 4B:
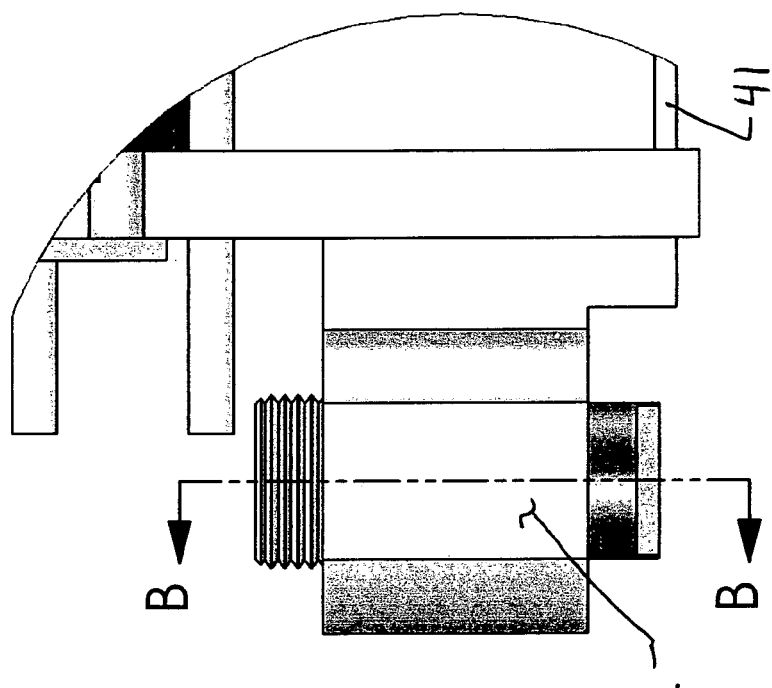
Figure 4B:
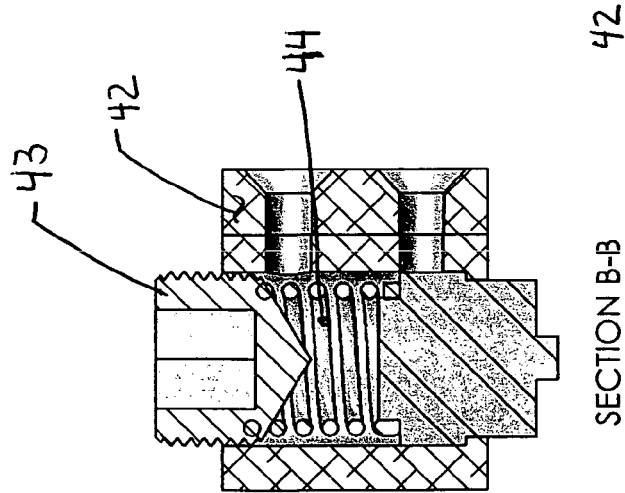

Referring now to FIGS. 4a and 4b the arrangement of the ultrasonic frequency converter 18 on an adjustable arm 41 is shown. The quality of the welded seam 25 is highly dependent on how well the hammer 14 and the anvil wheel 13 interface with the plastic material of the web 15. Since the thickness of the plastic material of web 15 can differ based on the particular material used or even within the same spool of material, a quality seam can be assured if the ultrasonic frequency converter 18 and hammer 14 assembly are mounted on an adjustable arm 41. The embodiment shown has the adjustable arm 41 riding on a spring loaded cam follower 42. The tension of the spring loaded cam follower can be adjusted in this embodiment using set screw 43, which either releases or compresses the spring 44 in the spring loaded cam follower 42 thereby adjusting the gap between the hammer 14 and the anvil wheel 13.

Figure 5:
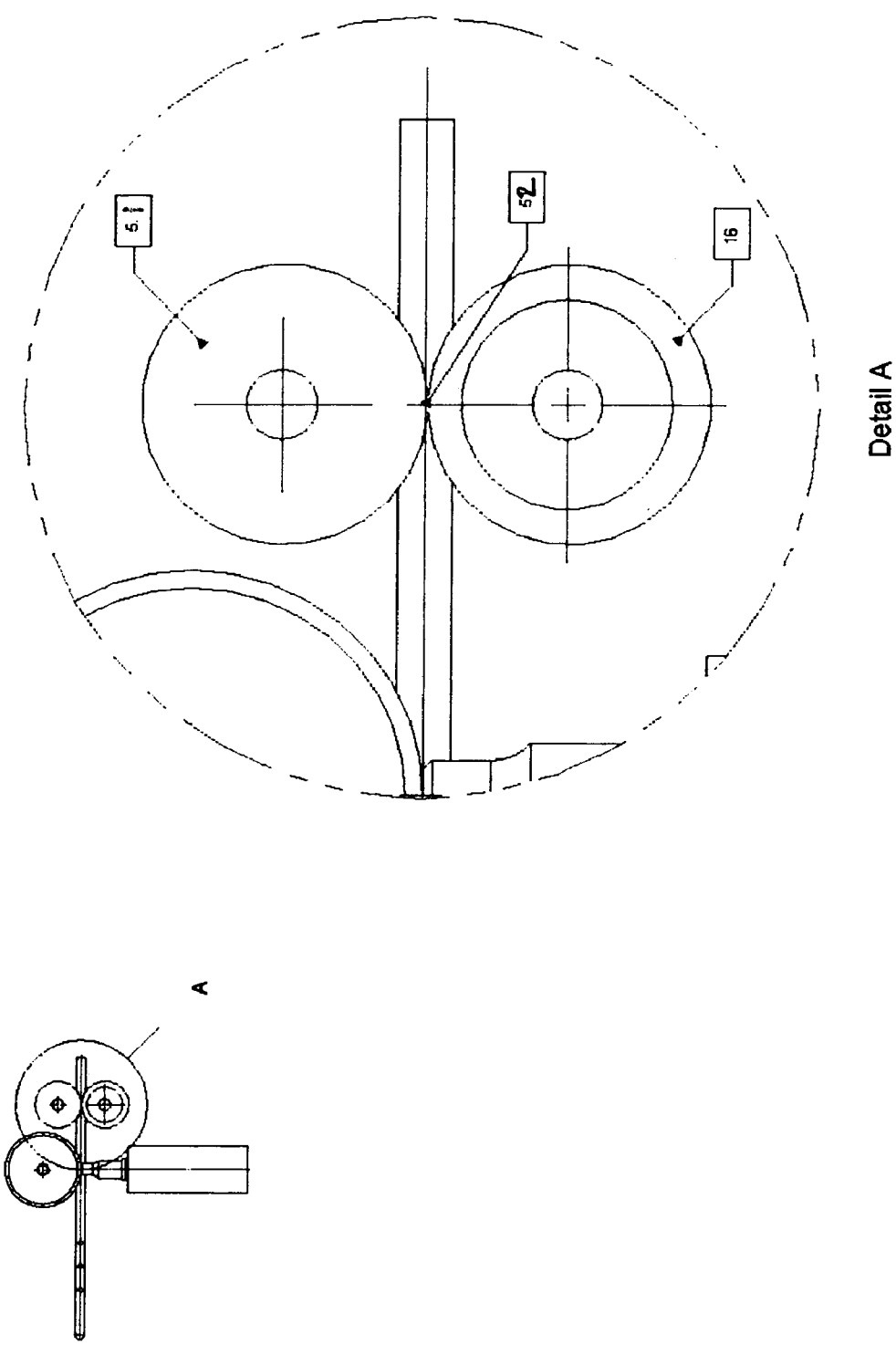
FIG. 5 is a detail view of a pulley wheel.

Referring now to FIG. 5, an embodiment of a pulley wheel 51 is shown having a knurled pattern 52. In the embodiment shown, knurled pattern 52 is a series of longitudinal grooves cut into the face of wheel. In one embodiment, pulley wheel 16 is made of rubber, and pulley wheel 17 is replaced by pulley wheel 51, which is made of metal and has knurled pattern 52 on its face. Pulley wheels 16 and 51 would be engaged in an interfering manner such that when one or both is driven it will pull web 15 through the interfering engagement and emboss the seam 25 with knurled pattern 52. In this manner, seam 25 will be made stronger, than if no knurled pattern was present on a pulley wheels.

Figure 6:
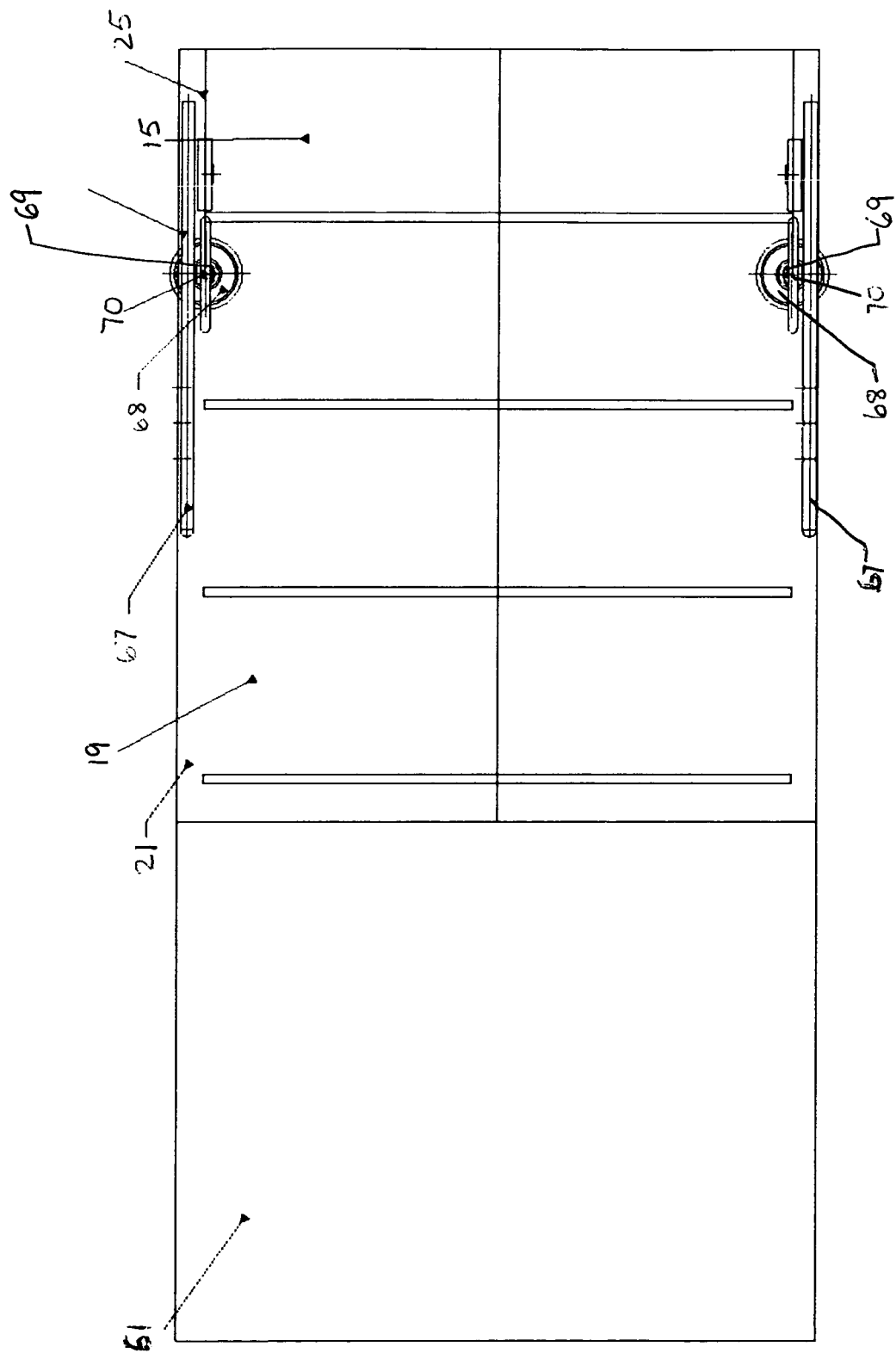
FIG. 6 is a view of a device for producing higher volumes of dunnage.

Referring now to FIG. 6 an embodiment is shown where multiple pieces of inflated dunnage can be manufactured at the same time. In this embodiment, a spool of material 61 can be provided which is segmented both longitudinally and laterally, to produce a roll with, for example, two bags across. As shown in this embodiment, duplicative assemblies of air nozzles 67, ultrasonic frequency converters 68, hammers 69 and anvil wheels 70 are required such that the number of assemblies is equal to the number of inflated dunnage that are arranged laterally on the spool of material 61. For example, if it is desired to produce two inflated dunnage bags at the same time, a spool of material that is segmented with two bags laterally to each other will be run through a device that has two assemblies with two air nozzles 67, two ultrasonic frequency converters 68, two hammers 69 and two anvil wheels 70. Alternatively, there could be an arrangement where there is a common seam between two longitudinally arranged bags, such that only one ultrasonic frequency converter/hammer assembly would be required. Yet another embodiment could have a single ultrasonic frequency converter unit driving two hammers.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for making dunnage, comprising:
    providing a web of material with a plurality of layers and predefined lateral and transverse edges forming pouches;
    passing the material over a nozzle, so that the nozzle is positioned between at least two of the layers;
    inflating the pouches with a gaseous or liquid material flowing through the nozzle;
    passing the material between an anvil and hammer, the hammer being mounted on an ultrasonic frequency generator;
    the ultrasonic frequency converter generating vibrations at a frequency such that when the material passes between the anvil and hammer, the material melts creating a seam and the pouches are sealed, thereby creating sealed dunnage pouches; and
    passing the seam between two wheels where at least one of the wheels includes a knurled surface, whereby the knurled pattern is embossed on the seam.

2. The method of claim 1 wherein the material is polypropylene.

3. The method of claim 1 wherein the position of the hammer relative to the anvil changes based on the thickness of the material.

4. An apparatus for manufacturing dunnage comprising:
    a plurality of rollers for pulling a web of material through the machine;
    a nozzle with at least one port through which gas or liquid flows;
    a hammer mounted on an ultrasonic frequency converter;
    an anvil mounted on the machine in a position such that the web of material can pass between the hammer and anvil while allowing the hammer to strike the anvil;
    the ultrasonic frequency converter being connected to a power source and generating vibrations at a frequency causing the hammer to vibrate at a frequency that will melt the portion of the material that is passing between the hammer and anvil thereby creating a seam; and
    at least one of the plurality of rollers has a knurled surface on its circumference, so that the roller will imprint the melted portion of material with the pattern of the knurled surface.

5. The apparatus defined in claim 4 wherein the engagement between the hammer and anvil is adjustable to accommodate varying thicknesses of web materials.

6. The apparatus defined in claim 4 wherein the engagement between the hammer and anvil is adjustable to accommodate varying thicknesses of web materials, and further comprising an adjustment mechanism comprising:
    an arm mounted on a spring cam follower;
    the height of the arm being adjustable by changing the position of the spring cam follower;
    the ultrasonic frequency converter being mounted on the arm, whereby when the height of the arm is adjusted, the position of the ultrasonic frequency converter and the hammer mounted thereon is adjusted.

7. The apparatus defined in claim 4 wherein the anvil is a wheel.

8. An apparatus for manufacturing dunnage comprising:
    a plurality of rollers for pulling a web of material through the machine;
    a nozzle with at least one port through which gas or liquid flows;
    a hammer mounted on an ultrasonic frequency converter;
    an anvil mounted on the machine in a position such that the web of material can pass between the hammer and anvil while allowing the hammer to strike the anvil;
    the ultrasonic frequency converter being connected to a power source and generating vibrations at a frequency causing the hammer to vibrate at a frequency that will melt the portion of the material that is passing between the hammer and anvil thereby creating a seam; and
    a plurality of rollers that engage the web of material wherein at least one of the rollers includes a knurled surface along its circumference that impresses its knurled pattern on the welded seam.

9. An apparatus for manufacturing dunnage comprising:
    means for pulling a web of material of a plurality of layers including predefined sections through the machine;
    means for inflating the predefined sections of the web of material and forming a pouch;
    ultrasonic frequency means for welding the layers of a portion of the inflated web of material; and
    means for adjusting the ultrasonic frequency means based on the thickness of the web of material.

* * * * *